United States Patent
Morales et al.

(10) Patent No.: US 10,349,478 B2
(45) Date of Patent: Jul. 9, 2019

(54) HIGH TOLERANCE AUTO-RANGING AC LED DRIVER APPARATUS AND METHODS

(71) Applicant: ISine Inc., Ronkonkoma, NY (US)

(72) Inventors: Louis J. Morales, Boston, MA (US); Nikolay I. Gishin, Framingham, MA (US)

(73) Assignee: ISINE Inc., Boston, MA (US)

( * ) Notice: Subject to any disclaimer, the term of this patent is extended or adjusted under 35 U.S.C. 154(b) by 0 days.

(21) Appl. No.: 15/881,724

(22) Filed: Jan. 26, 2018

(65) Prior Publication Data
US 2018/0220502 A1    Aug. 2, 2018

Related U.S. Application Data

(60) Provisional application No. 62/451,489, filed on Jan. 27, 2017.

(51) Int. Cl.
  *F21K 9/238*    (2016.01)
  *H05B 33/08*    (2006.01)

(52) U.S. Cl.
  CPC ......... *H05B 33/0815* (2013.01); *F21K 9/238* (2016.08); *H05B 33/083* (2013.01); *H05B 33/0824* (2013.01); *H05B 33/0851* (2013.01); *Y02B 20/345* (2013.01); *Y02B 20/347* (2013.01)

(58) Field of Classification Search
  CPC ............ H05B 33/0815; H05B 33/0827; H05B 33/083; H05B 33/0845; H05B 33/0818; H05B 33/0851; H05B 37/02; H05B 33/0809
  USPC ................. 315/186, 185 R, 122, 210, 200 R
  See application file for complete search history.

(56) References Cited

U.S. PATENT DOCUMENTS

| | | | |
|---|---|---|---|
| 8,896,235 B1 * | 11/2014 | Shum | H05B 33/083 315/193 |
| 9,204,510 B2 | 12/2015 | Morales | |
| 2009/0015178 A1 * | 1/2009 | Liu | H05B 33/0815 315/297 |
| 2010/0164403 A1 | 7/2010 | Liu | |
| 2010/0308738 A1 | 12/2010 | Shteynberg et al. | |
| 2010/0308739 A1 * | 12/2010 | Shteynberg | H05B 33/083 315/193 |
| 2011/0298384 A1 | 12/2011 | Tanigawa et al. | |
| 2014/0070710 A1 * | 3/2014 | Harris | H05B 33/0809 315/185 R |
| 2015/0289325 A1 * | 10/2015 | Szolusha | H05B 33/08 315/201 |
| 2016/0150605 A1 | 5/2016 | Kim | |
| 2016/0239030 A1 * | 8/2016 | Hsu | G05F 1/575 |

* cited by examiner

*Primary Examiner* — Wei (Victor) Chan
(74) *Attorney, Agent, or Firm* — Raymond J. Werner (57) ABSTRACT

In some embodiments, a circuit is provided that includes (1) a plurality of light emitting diode (LED) strings coupled to each other in series; (2) a power supply circuit coupled to a first LED string of the plurality of LED strings; (3) a feedback circuit coupled between a second LED string of the plurality of LED strings and the power supply circuit; and (4) a current steering circuit coupled to the first LED string of the plurality of LED strings and further coupled to the second LED string of the plurality LED strings. The current steering circuit includes a plurality of switchable conductive pathways.

14 Claims, 5 Drawing Sheets

HIGH TOLERANCE AUTO-RANGING AC LED DRIVER APPARATUS AND METHODS

RELATED APPLICATIONS

This nonprovisional application claims the benefit of provisional application 62/451,489, filed 27 Jan. 2017, and entitled "High Tolerance Auto-Ranging AC LED Driver," the entirety of which is hereby incorporated by reference herein for all purposes.

FIELD

The present application relates to light emitting diodes, and more particularly to high tolerance auto-ranging AC light emitting diode driver apparatus and methods.

BACKGROUND

Light bulbs based on light emitting diodes (LEDs) are commonly powered from an AC line, which is typically at voltages between 100 and 277 Volts Alternating Current (VAC) and at nominal frequencies of 50 Hz or 60 Hz. Strings of LEDs are typically used in such light bulbs. Each such string is made up of multiple serially connected LEDs. Although the LED light bulb is powered from the AC line, the LEDs themselves require direct current (DC). And, in order to avoid damage to the LEDs of the light bulb, the current supplied to the LEDs must not exceed the maximum DC current rating specified by the LED manufacturer. The voltage developed across an LED for a given current varies by a small but significant amount from one LED to another, and over time and temperature.

SUMMARY

In some embodiments, a circuit is provided that includes (1) a plurality of light emitting diode (LED) strings coupled to each other in series; (2) a power supply circuit coupled to a first LED string of the plurality of LED strings; (3) a feedback circuit coupled between a second LED string of the plurality of LED strings and the power supply circuit; and (4) a current steering circuit coupled to the first LED string of the plurality of LED strings and further coupled to the second LED string of the plurality LED strings. The current steering circuit includes a plurality of switchable conductive pathways.

In some embodiments, a light emitting diode (LED)-based light bulb includes a housing and a circuit disposed within the housing, the circuit includes (1) a plurality of light emitting diode (LED) strings coupled to each other in series; (2) a power supply circuit coupled to a first LED string of the plurality of LED strings; (3) a feedback circuit coupled between a second LED string of the plurality of LED strings, and the power supply circuit; and (4) a current steering circuit coupled to the first LED string of the plurality of LED strings, and further coupled to the second LED string of the plurality of LED strings. The current steering circuit includes a plurality of switchable conductive pathways.

In some embodiments, a light emitting diode (LED)-based light bulb is provided that includes (1) a plurality of LED strings, each LED string of the plurality of LED strings coupled in series to one of the other LED strings of the plurality of LED strings; (2) a power supply circuit coupled to a first LED string of the plurality of LED strings; (3) a feedback circuit coupled between a second LED string of the plurality of LED strings and the power supply circuit; and (4) a current steering circuit coupled to a cathode end of each LED string of the plurality of LED strings. The current steering circuit includes at least one switchable conductive pathway for each LED string of the plurality of LED strings, except for the last LED string in the plurality of serially coupled LED strings.

Numerous other aspects are provided. Other features and aspects of the present invention will become more fully apparent from the following detailed description, the appended claims and the accompanying drawings.

BRIEF DESCRIPTION OF THE DRAWINGS

Aspects of the present disclosure are best understood from the following detailed description when read with the accompanying figures. It is noted that, in accordance with the common practice in the industry, various features may not be drawn to scale. In fact, the dimensions of the various features may be arbitrarily increased or reduced for clarity of discussion.

DETAILED DESCRIPTION

Various example embodiments herein relate to a power supply that receives an AC line as an input, and produces direct current for the LEDs of a light bulb. Such a power supply circuit is referred to herein as an AC LED driver.

Disclosed herein are AC LED drivers that adjust the voltage applied to the LED strings of LED-based AC-powered, light bulbs. In some embodiments, the voltage adjustments are made in response to feedback based, at least in part, on a current source voltage. A boost- or buck-based voltage regulator, for example, converts incoming AC power to reduce or minimize losses in the current source. Feedback from one or more of the current sources of the AC LED driver is used by the voltage regulator to adjust the amplitude of the voltage applied to the LED string(s).

In one or more embodiments, an AC LED driver is provided that incorporates a time-varying switching voltage regulator and a current source that may be time-varying or fixed. The voltage regulator may be configured to accept 100 VAC to 277 VAC at nominal frequencies of 50 Hz or 60 Hz, which covers the full range of AC voltages worldwide, without change in the driver circuitry or LED wiring. Since voltage across the current source represents wasted power, various embodiments are presented whereby current-source voltage is fed back to the voltage regulator to adjust its output waveform to minimize the wasted power. Various embodiments achieve improvements in brightness, power regulation, and/or efficiency in the LED light bulb. In some embodiments, no electrolytic capacitor is employed and a major source of failure in LED bulbs is eliminated. These and other embodiments provided herein are described below.

The following disclosure provides several different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition does not in itself dictate a relationship between the various embodiments and/or configurations discussed.

Terminology

Historically, power factor has referred to the ratio of the real power to the apparent power (a number between 0 and 1, and commonly expressed as a percentage). Real power is the capacity of a circuit to perform work in a particular time. Apparent power is the product of the current and voltage in the circuit, and consists of real power plus reactive power. Due to either energy stored in the load and returned to the source, or to a non-linear load that distorts the wave shape of the current drawn from the source, the apparent power can be greater than the real power. More recently, power factor has come to be defined as:

$$\frac{\cos\theta}{\sqrt{1+THD^2}} \quad (1)$$

where θ is the phase shift from real power, and THD is the total harmonic distortion of the first fifteen harmonics. Low power factor loads increase losses in a power generation system and consequently increases energy costs.

Power factor correction refers to a technique of counteracting the undesirable effects of electric circuits that create a power factor that is less than one.

The acronym "RMS" refers to root mean square.

$V_f$ refers to the forward-bias voltage of an LED. As used herein, unless otherwise noted, $V_f$ is summed across an LED array in an LED-based lighting product.

The term "lamp," refers generally to a man-made source created to produce optical radiation. By extension, the term is also used to denote sources that radiate in regions of the spectrum adjacent to the visible. LED-based light bulbs may also be referred to as LED lamps. An LED-based light bulb includes a housing within which the LEDs and associated circuits are disposed.

The expression "branch circuit," as used herein refers to a portion of a wiring system that extends beyond the final, automatic overcurrent protective device (e.g., a fuse or a breaker) that qualifies for use as branch-circuit protection, and terminates at a utilization device or outlet (such as a lighting fixture, motor, or heater).

The term "luminaire," refers generally to a light fixture, and more particularly refers to a complete lighting unit that includes lamp(s) and ballast(s) (when applicable) together with the parts designed to distribute the light, position and protect the lamp(s), and to connect the lamp(s) to the power supply.

The expression "LED luminaire," refers to a complete lighting unit that includes LED-based light emitting elements (described below) and a matched driver together with parts to distribute light, to position and protect the light emitting elements, and to connect the unit to a branch circuit or other overcurrent protector. The LED-based light emitting elements may take the form of LED packages (components), LED arrays (modules), an LED Light Engine, or LED lamps. An LED luminaire is intended to connect directly to a branch circuit.

The expression "Solid State Lighting" (SSL) refers to the fact that the light is emitted from a solid object—a block of semiconductor—rather than from a vacuum or gas tube, as in the case of incandescent and fluorescent lighting. There are at least two types of solid-state light emitters, including inorganic light-emitting diodes (LEDs) and organic light-emitting diodes (OLEDs).

"Electrolytic capacitor" refers to a polarized capacitor suitable for use as an energy storage device.

The term "FET," as used herein, refers to metal-oxide-semiconductor field effect transistors (MOSFETs). These transistors are also known as insulated gate field effect transistors (IGFETs). An n-channel FET is referred to as an NFET. A p-channel FET is referred to as a PFET. A FET has a first source/drain terminal, a second source/drain terminal, and a gate terminal. A voltage applied to the gate terminal controls whether the FET is "on" or "off." When the voltage applied to the gate terminal puts the FET into the "on" state, conduction between the first source/drain terminal and the second source/drain terminal may take place.

Source/drain (S/D) terminals refer to the terminals of a FET, between which conduction occurs under the influence of an electric field resulting from a voltage applied to the gate terminal. Generally, the source and drain terminals of FETs used for logic applications are fabricated such that they are geometrically symmetrical. However, it is common that the source and drain terminals of power FETs are fabricated with asymmetrical geometries. With geometrically symmetrical source and drain terminals it is common to simply refer to these terminals as source/drain terminals, and this nomenclature is used herein. Designers often designate a particular source/drain terminal to be a "source" or a "drain" on the basis of the voltage to be applied to that terminal when the FET is operated in a circuit.

The term "TRIAC" refers to a three-terminal semiconductor device that conducts current in either direction when triggered. The TRIAC may also be referred to as a bidirectional triode thyristor, or bilateral triode thyristor. The term TRIAC is derived from "triode for alternating current."

The term "mains" is an alternative for the term "AC power."

The term "nominal," as used herein, refers to a desired, or target, value of a characteristic or parameter for a component or a signal, set during the design phase of a product, together with a range of values above and/or below the desired, or target, value. The range of values is typically due to slight variations in manufacturing processes or tolerances. By way of example and not limitation, a resistor may be specified as having a nominal value of 10 KΩ, which would be understood to mean 10 KΩ plus or minus a certain percentage (e.g., ±5%) of the specified value.

With respect to the various circuits, sub-circuits, and electrical circuit elements described herein, signals are coupled between them and other circuit elements via physical, electrically conductive connections. It is noted that, in this field, the point of connection is sometimes referred to as an input, output, input/output (I/O), terminal, line, pin, pad, port, interface, or similar variants and combinations.

Overview

Conventional AC LED drivers for LED-based light bulbs incorporate electrolytic capacitors. The inventor has determined that the dominant failure mode of such AC LED drivers is the failure of the electrolytic capacitors. Various embodiments in accordance with this disclosure reduce or eliminate this failure mode.

A first type of LED driver for LED-based light bulbs is a conventional AC to DC power supply that delivers a nominally constant DC voltage. The LEDs of the LED-based light bulb are grouped into "strings," each string having multiple LEDs electrically connected in series. The power supply is typically modified with a feedback circuit to make the DC voltage slowly vary in response to changes in current drawn by the LEDs. Such a power supply requires a relatively large capacitor to store energy during valleys in the AC cycle. The capacitor is costly, bulky, and typically electrolytic. The dominant failure mode of conventional LED light bulbs that incorporate such electrolytic capacitors, is the component failure of the electrolytic capacitor itself.

A second type of conventional AC LED driver—more sophisticated than the first type—provides power to the LED strings of an LED-based light bulb to a greater extent at peaks of the AC line voltage rather than at the valleys of the AC line voltage. In this way, the second type of AC LED driver reduces or eliminates major energy storage during the AC line cycle. And by reducing or eliminating the aforementioned energy storage, the need for an electrolytic capacitor is likewise reduced or eliminated. The first and second types of AC LED drivers draw AC power in a manner that approximates a resistive load. A string of LEDs is put across the rectified AC—that is, between the output node of a rectifier and the ground node. Total $V_f$ for the string is chosen to be similar to the peak AC line voltage. Current sources are present at several taps of the total string. When there is enough rectified voltage to turn on the first LED string segment, the first current source conducts. When the voltage is high enough to turn on the next string segment the first current source is turned off and the second current source turned on. In such a configuration, at peak voltage all of the LEDs are typically on.

This second type of conventional AC LED driver provides very good results in terms of THD, as the current delivered is proportional to the line voltage. A disadvantage of this second type of AC LED driver is that variations in the $V_f$ of LEDs, and variations in AC line voltage greatly affect efficiency and appearance of the LED-based light bulb. If the AC line voltage is low, or the $V_f$ of the LEDs is high, the last string of LEDs of the LED-based light bulb may be dim or not turn on at all. Likewise, if the AC line voltage is low, or the $V_f$ of the LEDs is high, power output of the AC LED driver will drop significantly. On the other hand, if the line voltage is high, or the $V_f$ of the LEDs is low, then the power output of the AC LED driver increases and its efficiency decreases.

Another disadvantage of conventional AC LED drivers results from the fact that they are typically designed for a single AC line voltage, e.g., 120 VAC at 60 Hz in the United States, or 230 VAC at 50 Hz, in Europe. Because these conventional AC LED drivers do not support multiple electric power systems, manufacturers carry an increased inventory of LED-based light bulb components in the manufacturing pipeline as compared to an AC LED driver that could operate over a wide range of input AC voltages.

First Example Embodiment

Figure 1:
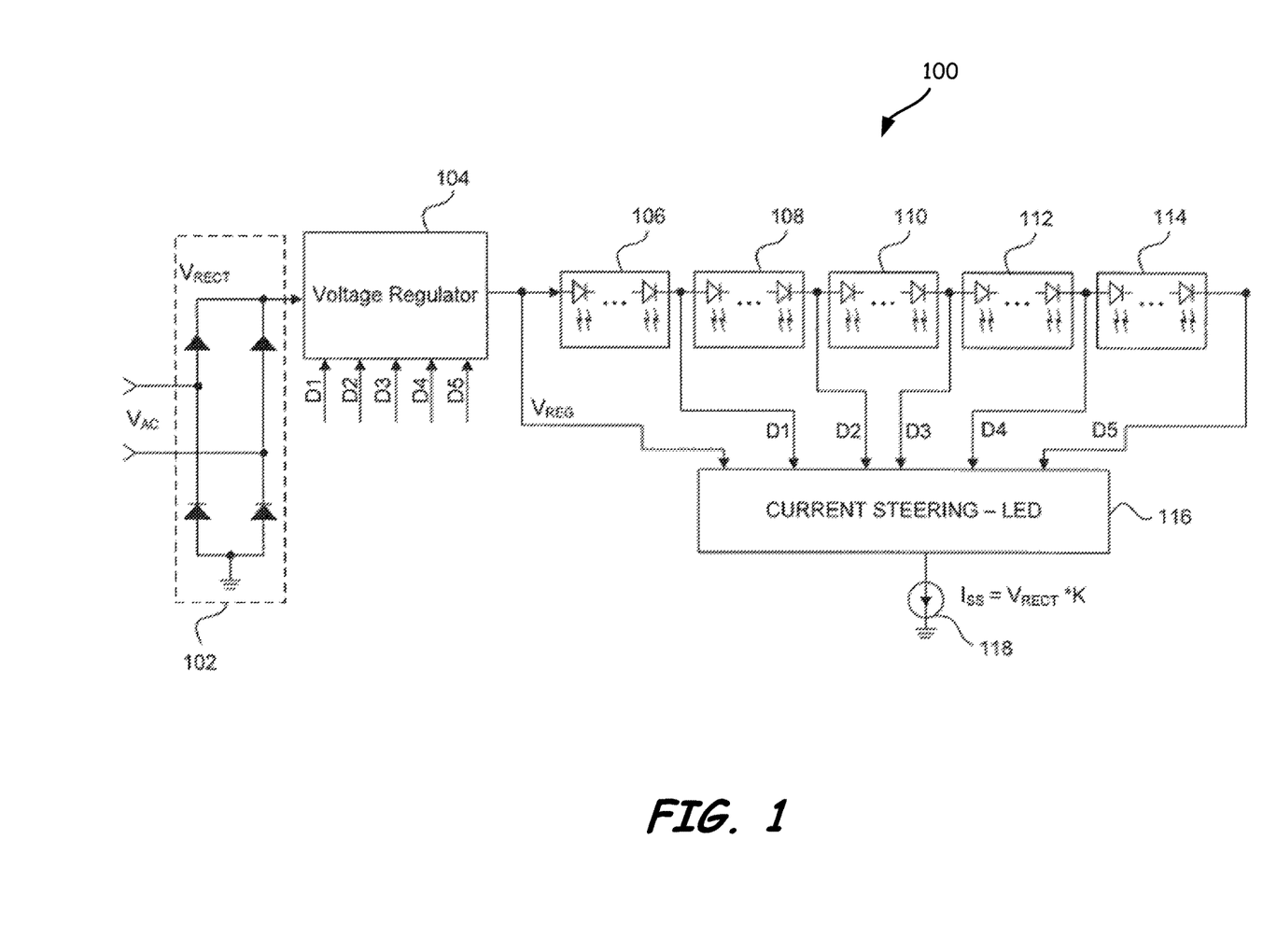
FIG. 1 is a high-level circuit diagram of a first example embodiment of an AC LED driver in accordance with embodiments provided herein.

A circuit diagram of a first example embodiment 100 of an LED Driver is shown in FIG. 1. Embodiment 100 includes a rectifier 102 coupled to receive the AC line voltage $V_{AC}$ and to output a rectified voltage $V_{RECT}$. Rectifier 102 of the first example embodiment is implemented as a full-wave rectifier; however, other embodiments in accordance with this disclosure are not limited to full-wave rectifiers. The rectified voltage $V_{RECT}$ of rectifier 102 is coupled to an input terminal of a voltage regulator 104. The output of voltage regulator 104 is coupled to the input terminal of a first string of LEDs 106, and is also coupled to an input terminal of a current steering circuit 116. The output of voltage regulator 104 is labelled $V_{REG}$ in FIG. 1. In operation, after the AC line voltage is rectified, the voltage regulator receives the rectified voltage output by rectifier 102 and produces the DC voltage used by LED strings to produce light. Example embodiments of voltage regulators are described below with reference to FIGS. 2 and 3.

Still referring to FIG. 1, five strings of LEDs 106, 108, 110, 112, and 114, coupled in series, are shown. This first example embodiment may be practiced with a larger or smaller number of LED strings, and LED strings may or may not include equal numbers of LEDs. The current steering circuit 116 of the first example embodiment includes FETs, which may be configured as switches and connected in parallel, that selectively connect the lines labeled $V_{REG}$ and D1 through D5 to a current source 118. The current through current source 118 is labelled $I_{SS}$ in FIG. 1, and is approximately equal to $V_{RECT}*K$. In various embodiments, current source 118 may be fixed, scaled with the input AC voltage, or a combination thereof. As used herein, "K" in $V_{RECT}*K$ refers to the current through current source 118 scaling linearly with the input AC voltage. It is noted that embodiments in which current source 118 scales with the input AC voltage provide improved power factor performance as compared to embodiments in which current source 118 is fixed.

In FIG. 1, the input connections shown on the top side of current steering circuit 116 are labelled with D's to indicate that these are coupled to the drain terminals of the FET switches of current steering circuit 116. The switches operate such that at a low $V_{REG}$, $I_{SS}$ current flows through only one LED string. At somewhat higher $V_{REG}$, current flows through two LED strings in series, and so on until at the highest $V_{REG}$, current is flowing through all five LED strings in series. Current steering circuit 116 is configured to smooth out transitions between x LED strings being turned on, and x+1 LED strings being turned on. Smoothing these transitions may reduce or eliminate the appearance of flickering by an LED bulb. In some embodiments, smoothing may be accomplished by controlling the FET switches in current steering circuit 116. In some embodiments, the control of the FET switches in current steering circuit 116 may be accomplished by driving the gate terminal of a FET switch with the output of an amplifier that slowly turns on the next stage (i.e., the next sequential LED string in a series connected plurality of LED strings in an LED bulb) as the voltage output of the voltage regulator reaches a magnitude great enough to power the next stage and maintain the current source in saturation. An example embodiment of a current steering circuit is described below with regard to FIG. 5. Additional details of current steering circuits suitable for use for with LED strings can be found in U.S. Pat. No. 9,204, 510, titled "Current Steering Module For Use With LED Strings," which is assigned to the assignee of this application and is hereby incorporated by reference herein in its entirety for all purposes.

Another current path through current steering circuit 116 (shown to the left of D1 in FIG. 1) bypasses all the LED strings in order to maintain a minimum current at all times. This minimum current is required by many TRIAC-based dimmer switches. Thus providing the current path to maintain the minimum current makes various embodiments in accordance with this disclosure compatible with TRIAC-based dimmer switches.

In this first example embodiment, current source 118 provides a time-varying current $I_{SS}$ that is configured to guarantee that the current drawn by the LED strings is proportional to the rectified voltage $V_{RECT}$. Since all current goes through this current source, the load seen by the source $V_{AC}$ is resistive (power=$K \cdot V_{RECT}^2$). In practice, the voltage across the LED strings approximates the incoming line voltage shape, using five strings in this first example embodiment. It is noted that alternative embodiments may have more or fewer LED strings. Also, because the current source 118 and rectifier 102 are not ideal, there will be some THD. The first example embodiment includes voltage regulator 104. Input terminals of voltage regulator 104 are coupled to signal lines D1 through D5. Voltage regulator 104 uses the signals on signal lines D1 through D5 to monitor voltages at the cathode end of each LED string 106, 108, 110, 112, and 114. In this first example embodiment, signal lines D1 through D5 carry negligible current when their respective paths through current steering circuit 116 are unselected. For example, when voltage regulator 104 provides a regulated voltage that is only great enough to power the first LED string of a plurality of serially connected LED strings, then the current through the first LED string passes via D1 through a selected path in current steering circuit 116. Thus there is negligible current through the remaining Dx paths because their corresponding LED strings in the plurality of LED strings turned off. However, when voltage regulator 104 provides a regulated voltage that is great enough to power the first and second LED strings of the plurality of serially connected LED strings, then the current through the first and second LED strings passes via D2 through a selected path in current steering circuit 116. In this instance, D2 is carrying the current but the remaining Dx lines carry negligible current. This pattern continues as voltage regulator 104 provides a regulated voltage that is great enough to turn on each additional LED string in the plurality of serially connected LED strings.

The waveform of the power delivered to the LEDs themselves, i.e., not including power dissipated in the FET switches of current steering circuit 116 and current source 118, can be distorted from an ideal sinusoid-squared waveform in order to reduce or minimize the voltage on the current source 118 as each string is turned on. The voltage output by voltage regulator 104 will therefore have a stepped pyramid shape. Power loss using this method is primarily from the voltage across the current source 118. The larger the steps, the larger is the average voltage across current source 118. This can be improved by making the first step larger and subsequent steps smaller for a given number of Dx lines. There is no current until rectified voltage Vrect is high enough to turn on the first LED string of the plurality of serially connected LED strings and allow current through D1, therefore there is essentially no efficiency loss until that point. Once the first LED string is turned on and current is passing through D1, the voltage across current source 118 increases (and losses increase) until the second LED string of the plurality of serially connected LED strings starts to conduct and current passes through D2. Power taken from the line voltage $V_{AC}$ will still be essentially sinusoidal-squared and have low THD.

Second Example Embodiment

Figure 2:
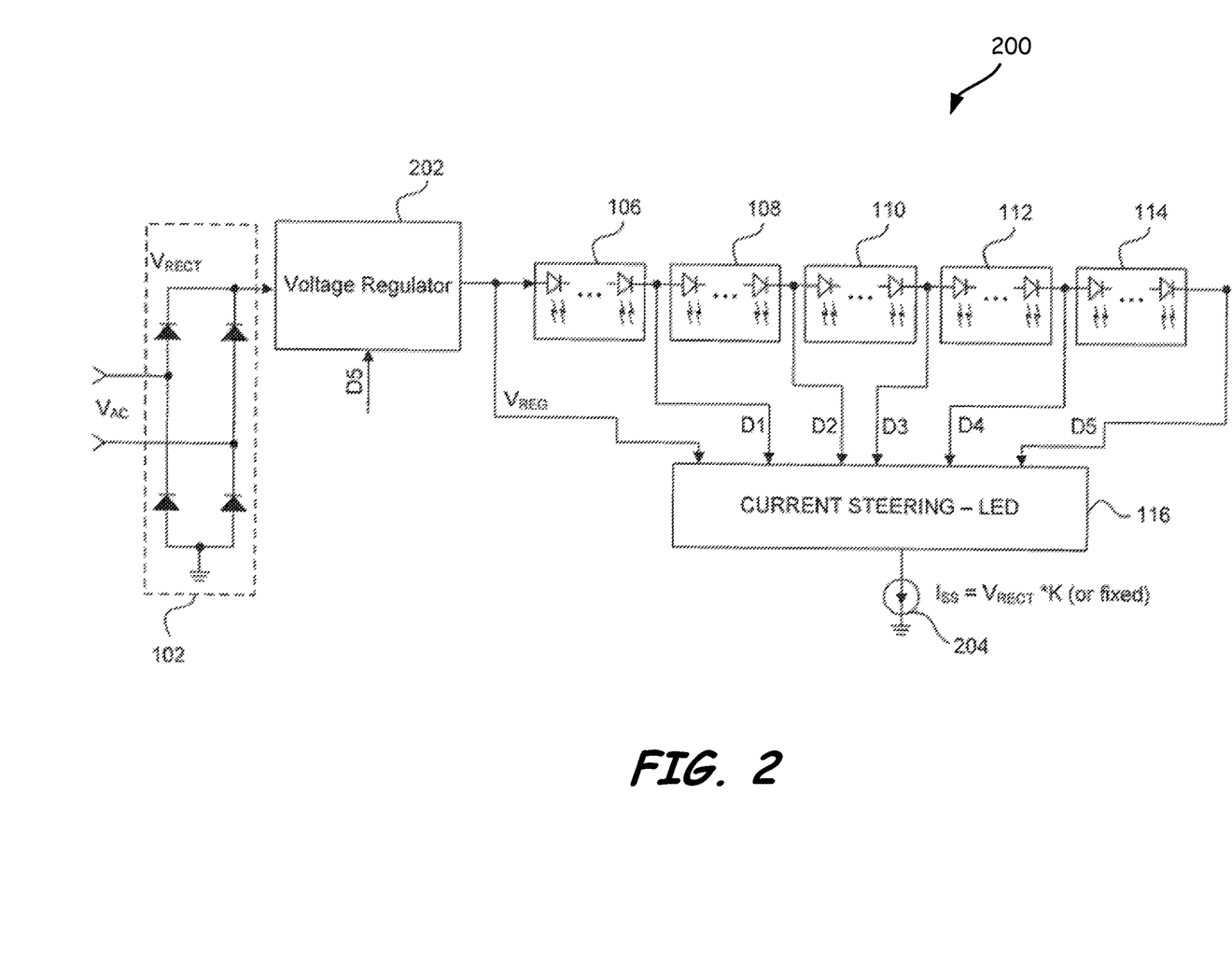
FIG. 2 is a high-level circuit diagram of a second example embodiment of an AC LED driver in accordance with embodiments provided herein.

FIG. 2 is a circuit diagram of a second example embodiment 200 of an LED Driver provided herein. With reference to FIG. 2, a rectifier 102 is coupled to the AC line. The output node $V_{RECT}$ of rectifier 102 is coupled to an input terminal of voltage regulator 202. Voltage regulator 202 receives a feedback signal D5, and provides, via an output terminal, an output voltage to a node labelled $V_{REG}$. In this example embodiment, D5 is fed back to voltage regulator 202 to direct voltage regulator 202 to maintain the drain voltage of the D5 path in a current steering circuit 116 at, or near, a desired peak voltage, or in some embodiments a desired average voltage. The output $V_{REG}$ of voltage regulator 202 is connected to an anode end of the series connected LEDs of a first string of LEDs 106. The first string of LEDs 106 has a cathode end coupled to an anode end of a second string of LEDs 108, and further coupled to a first input terminal of current steering circuit 116. The second string of LEDs 108 has a cathode end coupled to an anode end of a third string of LEDs 110, and further coupled to a second input terminal of current steering circuit 116. The third string of LEDs 110 has a cathode end coupled to an anode end of a fourth string of LEDs 112, and further coupled to a third input terminal of current steering circuit 116. The fourth string of LEDs 112 has a cathode end coupled to an anode end of a fifth string of LEDs 114, and further coupled to a fourth input terminal of current steering circuit 116. The fifth string of LEDs 114 has a cathode end coupled to a fifth input terminal of current steering circuit 116. Current steering circuit 116 has a sixth input terminal coupled to the output of voltage regulator 202 to receive the output voltage thereof. Current steering circuit 116 further has an output terminal coupled to a current source 204. Alternative embodiments may use more or fewer strings of LEDs. Such alternative embodiments may use correspondingly more or fewer input terminals coupled respectively to LED string cathode ends.

In this second example embodiment, the shape of the power waveform delivered LED strings 106-114 remains approximately sinusoidal-squared to correspond to the incoming line shape. The amplitude of the voltage at the output of voltage regulator 202 is adjusted to keep the last LED string current source, when active, just above saturation (i.e., the voltage needed by the D5 current source to accurately deliver the current $I_{SS}$). The path D5 is only carrying the current $I_{SS}$ at the peak of an AC half-cycle. This is because the output of voltage regulator 202 reaches its highest value responsive to the peak of the AC half-cycle, and at this highest value, but not necessarily limited to this highest value, there is enough voltage for all the of the LED strings of the plurality of serially connected LED strings to be turned on. In this example embodiment, D5 is connected to the last LED string of the plurality of serially connected LED strings. Hence, several line cycles are needed in order to control this amplitude, so the feedback loop response needs to be much slower than the AC line frequency.

Figure 3:
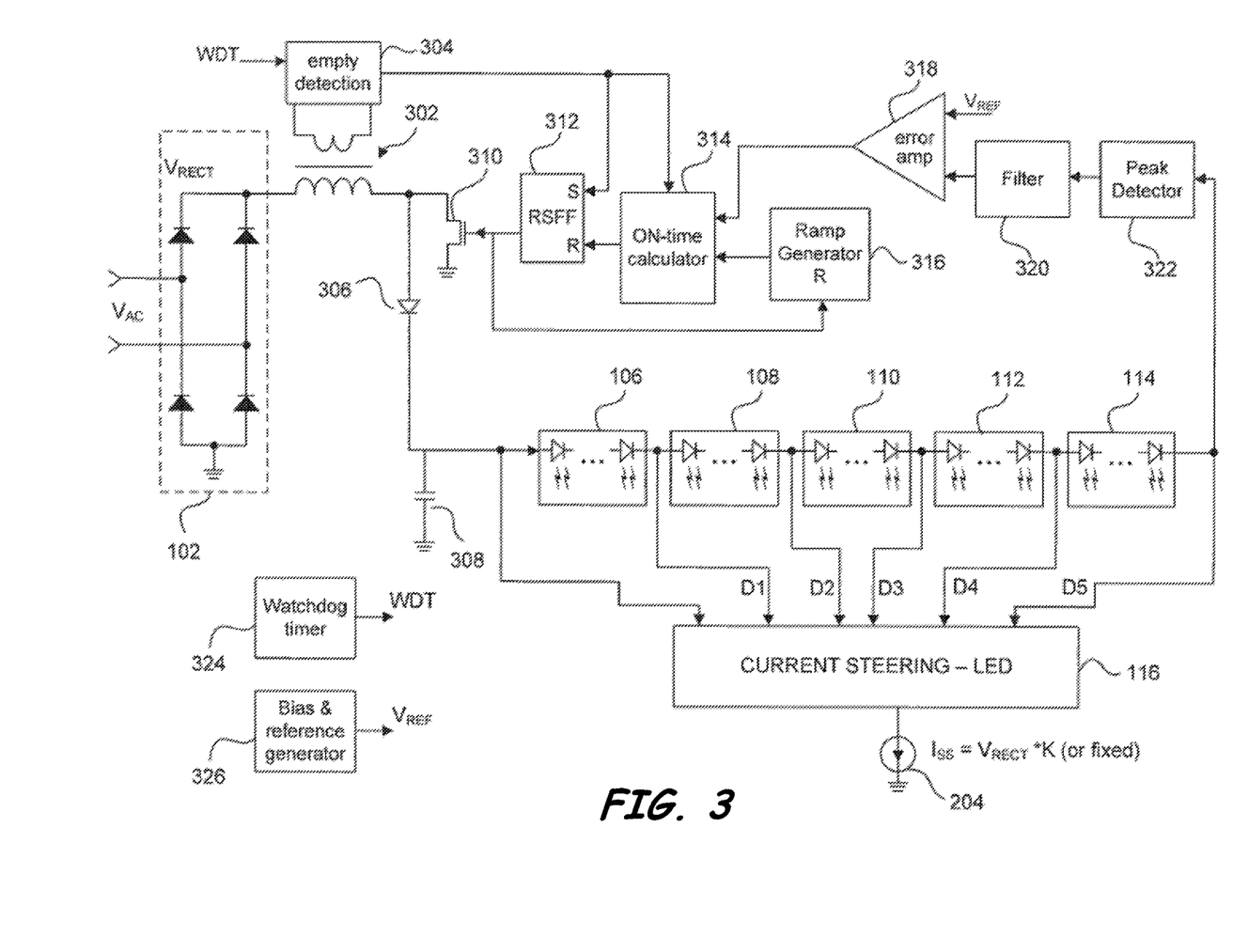
FIG. 3 is a circuit diagram of a third example embodiment of an AC LED driver in accordance with embodiments provided herein.

FIG. 3 is a circuit diagram of a more detailed implementation of the circuit shown in FIG. 2. A voltage regulator precedes an AC LED driver circuit. The voltage regulator 202 of FIG. 2 is shown in more detail in FIG. 3 as inductor 302, NFET 310, flip-flop 312, ON time calculator 314, ramp generator 316, error amplifier 318, filter 320, peak detector 322, and blocking diode 306. In this example five strings of LEDs 106, 108, 110, 112, and 114 are used. Input AC line voltages may range from 100 to 277 Volts RMS. The output voltage peak at capacitor 308 may be about 410V, which is higher than the maximum input voltage, so a boost regulator is used. In this example embodiment, the LED string total $V_f$ is chosen to be about 380V nominal.

In operation of the example circuit of FIG. 3, an inductor 302 with a current-sense winding is switched to ground for a calculated length of time, referred to herein as the ON time. In turn, the ON time determines the output power, and correspondingly the voltage across capacitor 308. A FET 310 is turned on for this ON time, and then turned off. In this example circuit, FET 310 is an NFET having a source coupled to ground, a drain coupled to inductor 302, and a gate coupled to an output of a flip-flop 312. In this example embodiment, flip-flop 312 is a set-reset flip-flop. Other FET types and/or flip-flop types may be used.

The energy stored in the inductor 302 when FET 310 turns off is proportional to the rectified voltage $V_{RECT}$ at that time, squared. $V_{RECT}$ is changing slowly compared to this voltage regulator oscillation (i.e., the 50 KHz to 100 KHz of the ramp generator) and hence is approximately constant during the cycle. That energy is then dumped into a capacitor 308, via a blocking diode 306. Once the inductor energy has been transferred to capacitor 308, an "empty detection" circuit 304 sets flip-flop 312, which in turn, turns FET 310 back on and restarts an ON time calculator 314 to recharge inductor 302. Empty detection circuits for voltage regulators, for example boost voltage regulators, are widely used and many such circuits are known. In one example embodiment, empty detection circuit 304 may be a resistor across a pickup coil with a comparator to indicate when the current goes to zero or goes negative.

The output of flip-flop 312 also controls the restart of a ramp generator 316, which provides an input to ON time calculator 314. Ramp generator 316, in this example embodiment, is a voltage ramp generator that produces a sawtooth waveform at a predetermined frequency. ON time calculator 314 counts the cycles of ramp generator 316 having a predetermined frequency to determine the length of time that has passed since it was last reset by an empty detection signal from empty detection circuit 304. This cycle repeats at a typical rate of 50 KHz to 100 KHz, which depends mainly on the inductor size chosen and the magnitude of the delivered power. Higher rates require a smaller inductor but are less efficient. Capacitor 308 is relatively small because the voltage fluctuations being smoothed out are at a frequency of 50 KHz to 100 KHz. In some embodiments, capacitor 308 may be a non-electrolytic capacitor. Non-electrolytic capacitors may be, but are not limited to, ceramic, tantalum, and film capacitors.

The peak voltage at the cathode end of the fifth LED string 114 is sensed by a peak detector 322 during that portion of the AC cycle when the current $I_{SS}$ passes through LED string 114. The output of peak detector 322 is then filtered for noise by a filter 320. Filter 320 may be a low-pass filter. Filter 320 may have a pass band that is lower than the frequency of Vrect, which is 50 Hz to 60 Hz, for example. In this example embodiment, filter 320 is configured to pass frequencies below about 10 Hz. This peak value is compared to a desired target value, for example 5V. Deviations from this target value are determined by an error amplifier 318. The output of error amplifier 318 is coupled to ON time calculator 314. Responsive to the output of error amplifier 318 the length of the ON time determined by ON time calculator 314 is either increased or decreased in order to maintain the voltage at the cathode end of the fifth LED string 114 near the target value, such as 5V in this example. The target voltage is chosen to be just high enough to allow the current source 204 to operate properly, but not too high since the target voltage times $I_{SS}$ represents wasted power. This is a negative feedback loop: when the voltage at the cathode end of fifth LED string 114 is too large, the ON time is shortened and $V_{REG}$ lowers (still following the rectified voltage $V_{RECT}$).

A watchdog timer 324 is included to be sure that the voltage regulator does not get stuck on by missing an empty detection. Watchdog timer 324 is also employed to start the initial cycle of the voltage regulator because there would not yet have been and empty detection. Thus, the watchdog timer 324 serves to initiate a cycle of the voltage regulator at power up, or any time the empty detection circuit 304 fails to properly detect the empty condition. A reference voltage generator 326 produces a signal $V_{REF}$ that is coupled to an input terminal of error amplifier 318. Reference voltage generator 326 may be a bandgap voltage reference, for example. Bandgap voltage references are well-known circuits and are widely available in standard cell libraries used to implement integrated circuits. Bandgap voltage references produce a fixed voltage that is independent of power supply variations.

In this example embodiment, the power wasted by having too much voltage at D5 when D5 is active is reduced, or minimized. Also, a range of AC line voltages can be supported without changing the LED strings. Because conventional AC LED drivers use the interface to the mains with different AC source voltages, they disadvantageously require LED strings with different $V_f$ for the different AC voltages. For example, in conventional applications, LED strings may be split in two and the two halves of each string wired in series for 230 VAC operation but in parallel for 120 VAC operation.

In an alternative embodiment, the current source 204 is further varied to keep each drain voltage minimized as each LED string is activated. This adds some distortion to the power drawn, but results in much better overall efficiency.

This alternative embodiment still uses a boost voltage regulator circuit like the embodiment of FIG. 3. However, where the voltage at $V_{REG}$ would have simply been a scaling of the line voltage, it would now appear as a stepped voltage even though the delivered power would still approximate $K \cdot V_{RECT}^2$. Current at $I_{SS}$ may be varied to reduce or minimize the drain voltages on each Dn as the delivered power increases. It would thus be a dual feedback system.

For the embodiment of FIG. 3, as for any AC LED driver, power is lost primarily when voltage at $V_{REG}$ is higher than the sum of the $V_f$ of the active strings. For example, assume that $V_f$ is 168V for first LED string 106, and 56V for each of LED strings 108, 110, 112, and 114. As voltage at $V_{REG}$ rises above 168V through to 222V, first LED string 106 is the only string conducting. The total $V_f$ across first LED string 106 remains approximately 168V throughout this range. Current drawn when the $V_{REG}$ voltage is above 168V causes current source 204 and D1 switch to dissipate the additional power $(V_{REG} - 168 \text{ V}) \cdot V_{RECT} \cdot K$.

However, the alternative circuit to the embodiment of FIG. 3 would increase $I_{SS}$ above $V_{RECT} \cdot K$ by an amount EF, that is fed back, as the power delivered from the boost regulator increases, thereby maintaining the voltage at D1 at a low value at the beginning of the AC half-cycle, for example, less than 5V. Once the incoming AC line voltage is sufficient to boost the voltage $V_{REG}$ enough to support first and second LED strings 106 and 108, pathway D1 in current steering circuit 116 is switched off, pathway D2 in current steering circuit 116 switched on, and $V_{REG}$ steps up to the sum of $V_f$ for strings 106 and 108. A similar regulation would be conducted on D2, and so forth.

The determination as to when to switch to the subsequent Dn can be pre-determined by phase angle into the cycle and the current returned, to simply $V_{RECT}\cdot K$, i.e., EF=0, when a switching occurs.

For simplicity, the above discussion has the voltages $V_{RECT}$ and $V_{REG}$ rising as additional LED strings are activated one by one. This represents the first half of an AC half-cycle. The second half of the AC half-cycle operates in an analogous manner with the voltages falling and the strings deactivated one by one.

FETs such as those described in connection with the current steering circuit 116 to provide an example, are broadly considered herein to be switchable conductive pathways because a conductive pathway through the FET can be switched on and off by applying voltage to the gate terminal. In various alternative embodiments one or more bipolar junction transistors (BJTs), together with any appropriate biasing network, may be substituted for one or more FETs. Those skilled in the art and having the benefit of this disclosure would be able to make such substitutions without undue experimentation.

Figure 4:
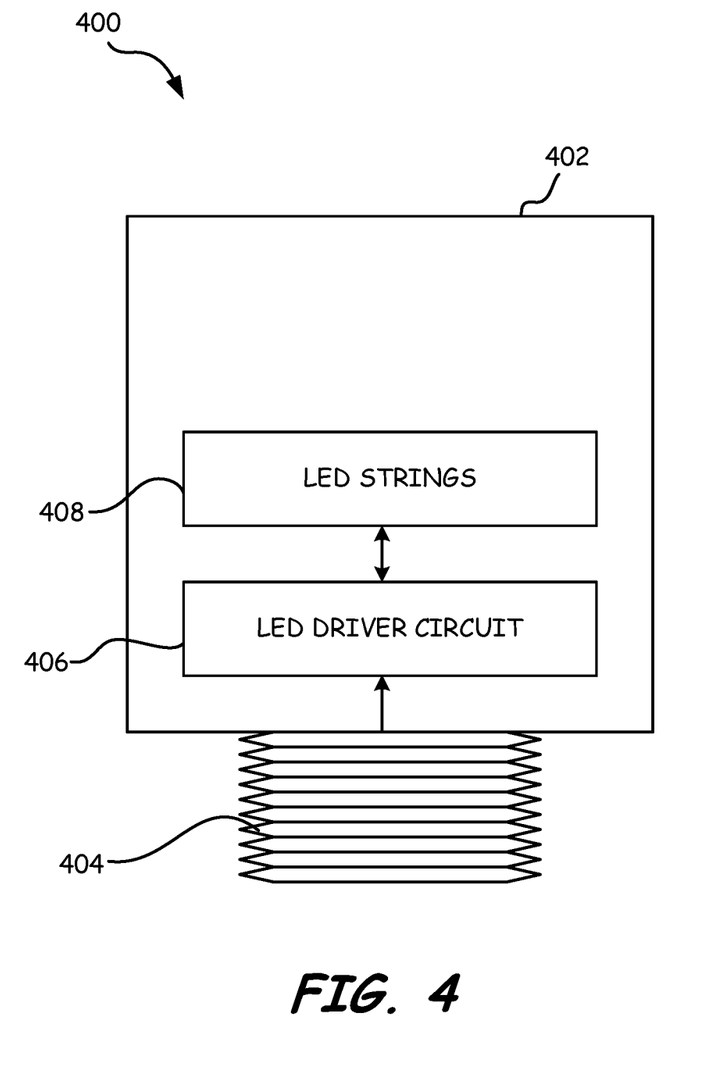
FIG. 4 is a schematic block diagram of an example LED light bulb in accordance with embodiments provided herein.

Referring to FIG. 4, an example LED-based light bulb 400 is described. LED-based light bulb 400 includes a housing 402, and a screwbase 404 coupled to housing 402. Screwbase 404 provides an interface to the AC power mains, and is configured to be screwed into a light bulb socket. Housing 402 may be made of any suitable material such as, but not limited to plastic. At least a portion of housing 402 permits visible light to pass through it. LED-based light bulb 400 further includes LED driver circuit 406 disposed within housing 402 and configured to receive AC voltage via screwbase 404. LED driver circuit 406 is further configured to provide DC voltage to one or more serially connected LED strings 408. The one or more LED strings 408 are disposed within housing 402 and are configured to receive DC voltage from LED driver circuit 406. In one or more embodiments, the LED driver circuit 406 may be configured similar to and/or operate as described above with regard to LED driver circuits of FIGS. 1-3.

Figure 5:
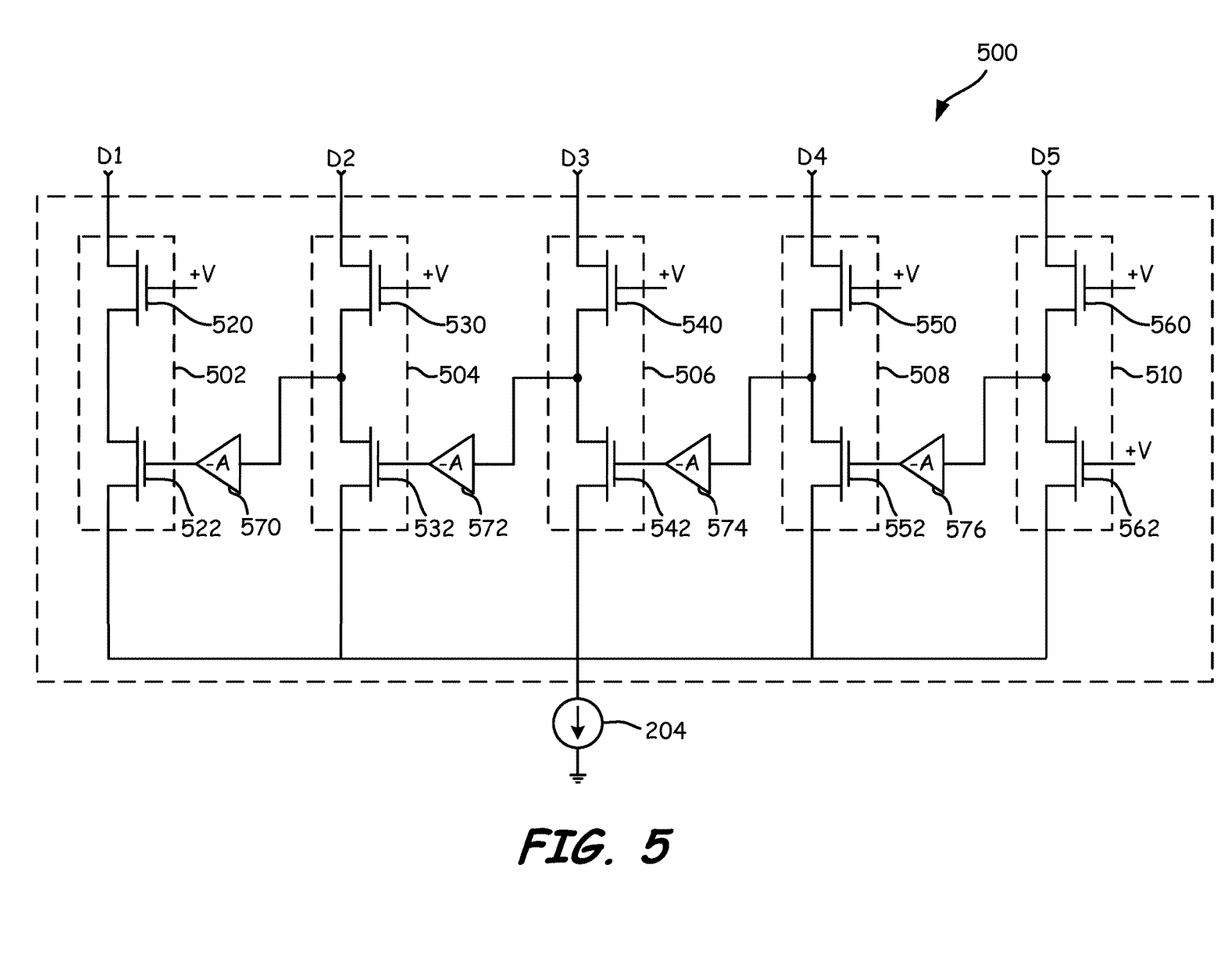
FIG. 5 is a schematic diagram of an example current steering circuit in accordance with embodiments provided herein.

Referring to FIG. 5, an example current steering circuit 500 is described. Current steering circuit 116 of FIGS. 1-3 may be similar to current steering circuit 500, for example. Current steering circuit 500 includes a first current steering block 502, a second current steering block 504, a third current steering block 506, a fourth current steering block 508, and a fifth current steering block 510, and a current source 208. First current steering block 502 includes NFETs 520 and 522 coupled in series from source to drain to form a first common node. The gate terminal of NFET 520 is coupled to a positive bias voltage, +V. The gate terminal of NFET 522 is coupled to the output of amplifier 570 having a gain of −A (e.g., an inverting amplifier). A first terminal of first current steering block 502 is coupled to D1, and a second terminal of first current steering block 502 is coupled to a current source 204. Second current steering block 504 includes NFETs 530 and 532 coupled in series from source to drain to form a second common node. The gate terminal of NFET 530 is coupled to the positive bias voltage, +V. The gate terminal of NFET 532 is coupled to the output of amplifier 572 having a gain of −A (e.g., an inverting amplifier). A first terminal of second current steering block 504 is coupled to D2, and a second terminal of second current steering block 504 is coupled to the current source 204. Third current steering block 506 includes NFETs 540 and 542 coupled in series from source to drain to form a third common node. The gate terminal of NFET 540 is coupled to the positive bias voltage, +V. The gate terminal of NFET 542 is coupled to the output of amplifier 574 having a gain of −A (e.g., an inverting amplifier). A first terminal of third current steering block 506 is coupled to D3, and a second terminal of third current steering block 506 is coupled to the current source 204. Fourth current steering block 508 includes NFETs 550 and 552 coupled in series from source to drain to form a fourth common node. The gate terminal of NFET 550 is coupled to the positive bias voltage, +V. The gate terminal of NFET 552 is coupled to the output of amplifier 576 having a gain of −A (e.g., an inverting amplifier). A first terminal of fourth current steering block 508 is coupled to D4, and a second terminal of fourth current steering block 508 is coupled to the current source 204. Fifth current steering block 510 includes NFETs 560 and 562 coupled in series from source to drain to form a fifth common node. The gate terminal of NFET 560 is coupled to the positive bias voltage, +V, and the gate terminal of NFET 562 is also coupled to the output of positive bias voltage, +V. A first terminal of fifth current steering block 510 is coupled to D5, and a second terminal of fifth current steering block 510 is coupled to the current source 204. An input terminal of amplifier 570 is coupled to the second common node. An input terminal of amplifier 572 is coupled to the third common node. An input terminal of amplifier 574 is coupled to the fourth common node. An input terminal of amplifier 576 is coupled to the fifth common node. Operational details of such current steering circuits are described in previously incorporated U.S. Pat. No. 9,204,510, titled "Current Steering Module For Use With LED Strings."

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the subjoined claims.

What is claimed is:

1. A circuit, comprising:
  a plurality of light emitting diode (LED) strings coupled to each other in series;
  a power supply circuit coupled to a first LED string of the plurality of LED strings;
  a feedback circuit coupled between a second LED string of the plurality of LED strings and the power supply circuit; and
  a current steering circuit coupled to the first LED string of the plurality of LED strings and further coupled to the second LED string of the plurality of LED strings;
  wherein the current steering circuit includes a plurality of switchable conductive pathways, and wherein the feedback circuit comprises:
  a peak detector having an input terminal and an output terminal;
  a filter having an input terminal and an output terminal, the input terminal of the filter coupled to the output terminal of the peak detector;
  an error amplifier having a first input terminal, a second input terminal, and an output terminal, the first input terminal of the error amplifier coupled to the output terminal of the filter; and an ON time calculator having a first input terminal, a second input terminal, a third input terminal, and an output terminal, the first input terminal of the ON time calculator coupled to the output terminal of the error amplifier.

2. The circuit of claim 1, further comprising:
an empty detection circuit coupled to the power supply circuit, wherein the empty detection circuit is configured to determine when an inductor has been discharged and generate an empty detection signal responsive thereto.

3. The circuit of claim 2, further comprises:
a watchdog timer coupled to the empty detection circuit, wherein the watchdog timer is configured to initiate a voltage regulator cycle after a predetermined period of time without an occurrence of an empty detection signal.

4. The circuit of claim 1, further comprises:
a reference voltage generator having an output terminal coupled to the second input terminal of the error amplifier.

5. The circuit of claim 1, further comprising:
a capacitor having a first terminal and a second terminal, the first terminal of the capacitor coupled to the first LED string of the plurality of LED strings and further coupled to a blocking diode, and the second terminal of the capacitor coupled to a ground node.

6. A light emitting diode (LED)-based light bulb, comprising:
a housing; and
a circuit disposed within the housing, the circuit comprising:
  a plurality of light emitting diode (LED) strings coupled to each other in series;
  a power supply circuit coupled to a first LED string of the plurality of LED strings;
  a feedback circuit coupled between a second LED string of the plurality of LED strings, and the power supply circuit; and
  a current steering circuit coupled to the first LED string of the plurality of LED strings, and further coupled to the second LED string of the plurality of LED strings;
wherein the current steering circuit includes a plurality of switchable conductive pathways, and wherein the feedback circuit comprises:
  a peak detector having an input terminal and an output terminal;
  a filter having an input terminal and an output terminal, the input terminal of the filter coupled to the output terminal of the peak detector;
  an error amplifier having a first input terminal, a second input terminal, and an output terminal, the first input terminal of the error amplifier coupled to the output terminal of the filter; and
  an ON time calculator having a first input terminal, a second input terminal, a third input terminal, and an output terminal, the first input terminal of the ON time calculator coupled to the output terminal of the error amplifier.

7. The LED-based light bulb of claim 6, further comprising:
an empty detection circuit coupled to the power supply circuit, wherein the empty detection circuit is configured to determine when an inductor has been discharged and generate an empty detection signal response thereto.

8. The LED-based light bulb of claim 7, further comprising:
a watchdog timer coupled to the empty detection circuit, wherein the watchdog timer is configured to initiate a voltage regulator cycle after a predetermined period of time without an occurrence of an empty detection signal.

9. The LED-based light bulb of claim 6, further comprising:
a reference voltage generator having an output terminal coupled to the second input terminal of the error amplifier.

10. The LED-based light bulb of claim 6, further comprising:
a capacitor having a first terminal and a second terminal, the first terminal of the capacitor coupled to the first LED string of the plurality of LED strings and further coupled to a blocking diode, and the second terminal of the capacitor coupled to a ground node.

11. A light emitting diode (LED)-based light bulb, comprising:
a plurality of serially coupled LED strings;
a power supply circuit coupled to a first LED string of the plurality of LED strings;
a feedback circuit coupled between a second LED string of the plurality of LED strings and the power supply circuit;
a current steering circuit coupled to a cathode end of each LED string of the plurality of LED strings;
an empty detection circuit coupled to the feedback circuit, wherein the empty detection circuit is configured to determine when an inductor has been discharged and generate an empty detection signal responsive thereto; and
a watchdog timer coupled to the empty detection circuit, wherein the watchdog timer is configured to initiate a voltage regulator cycle after a predetermined period of time without an occurrence of an empty detection signal;
wherein the current steering circuit includes at least one switchable conductive pathway for each LED string of the plurality of LED strings, except for the last LED string in the plurality of serially coupled LED strings.

12. The LED-based light bulb of claim 11, further comprising:
a reference voltage generator coupled to the feedback circuit.

13. The LED-based light bulb of claim 11, further comprising:
a housing, wherein the plurality of serially coupled LED strings are disposed in the housing, wherein at least a portion of the housing is transparent to visible light.

14. The LED-based light bulb of claim 11, wherein the feedback circuit further comprises:
a peak detector.

* * * * *